(12) United States Patent
Shanmugam

(10) Patent No.: US 12,539,958 B2
(45) Date of Patent: Feb. 3, 2026

(54) SANDWICH PANEL WITH NOISE DAMPENING

(71) Applicant: The Boeing Company, Arlington, VA (US)

(72) Inventor: Umamaheswaran Shanmugam, Chennai (IN)

(73) Assignee: The Boeing Company, Arlington, VA (US)

( * ) Notice: Subject to any disclaimer, the term of this patent is extended or adjusted under 35 U.S.C. 154(b) by 195 days.

(21) Appl. No.: 18/528,930

(22) Filed: Dec. 5, 2023

(65) Prior Publication Data

US 2025/0178714 A1 Jun. 5, 2025

(51) Int. Cl.
   *B64C 1/40* (2006.01)
   *G10K 11/168* (2006.01)
   *G10K 11/20* (2006.01)

(52) U.S. Cl.
   CPC .............. *B64C 1/40* (2013.01); *G10K 11/168* (2013.01); *G10K 11/20* (2013.01)

(58) Field of Classification Search
   CPC ......... B64C 1/40; G10K 11/168; G10K 11/20
   See application file for complete search history.

(56) References Cited

U.S. PATENT DOCUMENTS

| | | | |
|---|---|---|---|
| 8,662,249 B2* | 3/2014 | Nair .................... | G10K 11/168 181/290 |
| 8,770,344 B2* | 7/2014 | Borroni .................. | B32B 27/12 181/290 |
| 11,505,137 B2* | 11/2022 | Furuzawa ............ | G10K 11/172 |
| 11,545,128 B2* | 1/2023 | Su ........................ | G10K 11/162 |
| 11,732,467 B2* | 8/2023 | Fishman .............. | G10K 11/172 181/290 |
| 12,211,475 B2* | 1/2025 | Sakamoto ............ | G10K 11/172 |
| 12,387,705 B2* | 8/2025 | Zhao .................... | G10K 11/168 |
| 2020/0378111 A1* | 12/2020 | Fishman .................. | B32B 5/02 |

* cited by examiner

*Primary Examiner* — Forrest M Phillips
(74) *Attorney, Agent, or Firm* — Yee & Associates, P.C.

(57) ABSTRACT

A sandwich panel comprising a first layer, a second layer, and a core layer located between the first layer and the second layer. The core layer is comprised of structures connected by channels. The structures and the channels reflect sound waves entering the core layer.

24 Claims, 11 Drawing Sheets

SANDWICH PANEL WITH NOISE DAMPENING

BACKGROUND INFORMATION

1. Field

The present disclosure relates generally to composite materials and in particular to sandwich panels with noise dampening.

2. Background

A sandwich panel is a structure used in various structures and platforms including in aircraft. A sandwich panel is a multilayer structure comprised of a core between two outer layers. These layers can also be referred to as face sheets.

The core material is typically made of lightweight materials and can have a honeycomb type structure. This core material often has good insulating properties. The outer layers are typically made of rigid materials. These materials can include steel, aluminum, fiber reinforced composites, glass fiber composites, aluminum, fiberglass, and other suitable materials.

Sandwich panels can be lighter weight because of the material and design of the core structure. Further, with rigid outer layers, the structural properties of sandwich panels can be used in many types of platforms and reduce the weight of the platforms.

Sandwich panels are often used in aircraft because of the strength to weight ratio as well as durability and corrosion resistance. Sandwich panels can be used in wings, tail sections, and control surfaces. Further, the sandwich panels are also used in the interior of an aircraft such as carbon dividers, overhead compartments, floor panels, and other structures. The use of sandwich panels can increase fuel efficiency of aircraft.

SUMMARY

One embodiment of the present disclosure provides a sandwich panel comprising a first layer, a second layer, and a core layer located between the first layer and the second layer. The core layer is comprised of structures connected by channels. The structures and the channels reflect sound waves entering the core layer.

Another embodiment of the present disclosure provides a sandwich panel comprising a first layer, a core layer, and a second layer. The first layer is comprised of a number of porous materials that dissipate energy in sound waves passing through the first layer. The core layer is comprised of structures connected by channels and the structures, and the channels reflect sound waves entering the core layer from the first layer such that at least one of a wavelength of the sound waves increases in length or a frequency of the sound waves decreases. The second layer is comprised of the number of porous materials that dissipate the energy in the sound waves from the core layer passing through the second layer into an interior of an aircraft, wherein the core layer is located between the first layer and the second layer.

Yet another embodiment of the present disclosure provides a method for dampening sound waves. Energy is dissipated in sound waves using a first layer in a sandwich panel. The sound waves are reflected through structures connected by channels in a core layer in the sandwich panel such that a wavelength of the sound waves increases in length. The sound waves enter the core layer from the first layer. The energy in the sound waves that travel through a second layer in the sandwich panel from the core layer is dissipated. The sound waves entering an interior of a platform are dampened.

Still another embodiment of the present closure provides a method of reducing a frequency of sound waves passing through a sandwich panel. At least a portion of sound waves passing through a first layer of the sandwich panel is absorbed. Sound waves from the first layer of the sandwich panel are passed across a core layer of the sandwich panel. The sound waves which hit a corner of a material in the structure are reflected and transferred between the structures through channels in the second layer of the sandwich panel.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
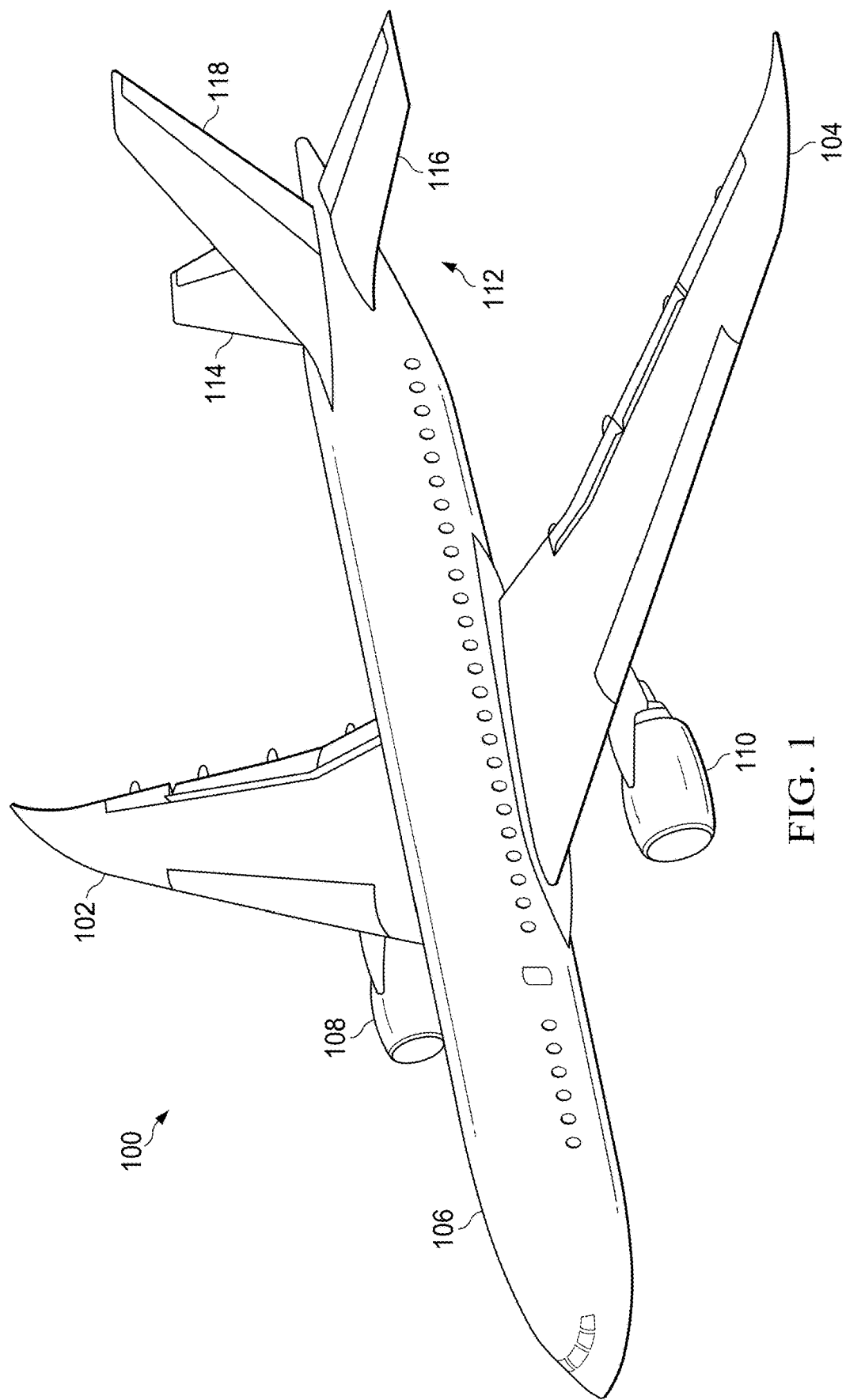
FIG. 1 is a pictorial illustration of an aircraft in accordance with an illustrative embodiment.

The illustrative embodiments recognize and take into account one or more different considerations as described herein. A large portion of the noise generated by the propulsion system of an aircraft occurs during different phases of flight. For example, noise can be greater during phases such as takeoff, climb, descent, and landing of aircraft as compared to the aircraft moving on the ground during taxiing or other ground maneuvers. The noise from the propulsion system aircraft during these and other phases can enter the cabin of an aircraft.

This noise can affect the passenger experience. For example, the noise can result in discomfort and anxiety for passengers. Additionally, noise can also disrupt conversations and increase difficulty in enjoying entertainment systems. As a result, passenger experience may not be as desirable with the occurrence of noise from the propulsion system of the aircraft entering the cabin.

Insulation barriers can be used between the outer structure of the aircraft and the liners. These insulation barriers control the sound waves to limit the amount of noise that a passenger hears. Noise can also be reduced through implementing measures such as quieter engines, quieter takeoffs, and other measures.

However, during takeoff and landing, passengers often still hear loud sounds. Thus, it would be desirable to have at least one of a method, apparatus, or system that provides improved noise reduction. The illustrative examples provide a method, apparatus, and system for reducing noise in the interior of aircraft. In the illustrative examples, noise can be reduced using a sandwich panel that has noise dampening. In one illustrative example, the sandwich panel comprises a core with two outer layers. A first outer layer in the sandwich panel received the sound on the exterior of the aircraft and operate to consume sound energy in the sound. The core layer in the sandwich panel can increase the distance that the sound travels within the core using structures such as homes and chambers connected to each other by channels. This core can employ the Doppler effect to increase the size of the wavelength, reducing the frequency such that the sound is not as easy to hear. The second outer layer can receive sound from the core and further consume sound energy. As a result, the sound entering the interior of the aircraft such as a passenger cabin and be reduced such that the noise is less noticeable. This reduction can increase noise in a manner that is greater as compared to current sandwich panels used in aircraft.

Thus, illustrative examples provide a method, apparatus, and system for at least one of dissipating or reducing the effects of sound waves. The phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C, or item B and item C. Of course, any combination of these items can be present. In some illustrative examples, "at least one of" can be, for example, without limitation, two of item A; one of item B; and ten of item C; four of item B and seven of item C; or other suitable combinations.

A sandwich panel comprises a first layer, a second layer, and a core layer located between the first layer and the second layer. The core layer is comprised of structures connected by channels. The structures and the channels reflect sound waves entering the core layer.

With reference now to the figures and in particular, turning now to FIG. 1, a pictorial illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft that can have sound dampening structures that reduce sound entering the interior of aircraft 100. In particular, the amount of sound reaching a cabin (not shown) in body 106 of aircraft 100 can be reduced in a manner that limits the amount of noise within the interior, such as sandwich panels in accordance with the illustrative examples. For example, sandwich panels formed in accordance with illustrative examples can be used within body 106 of aircraft 100.

Figure 2:
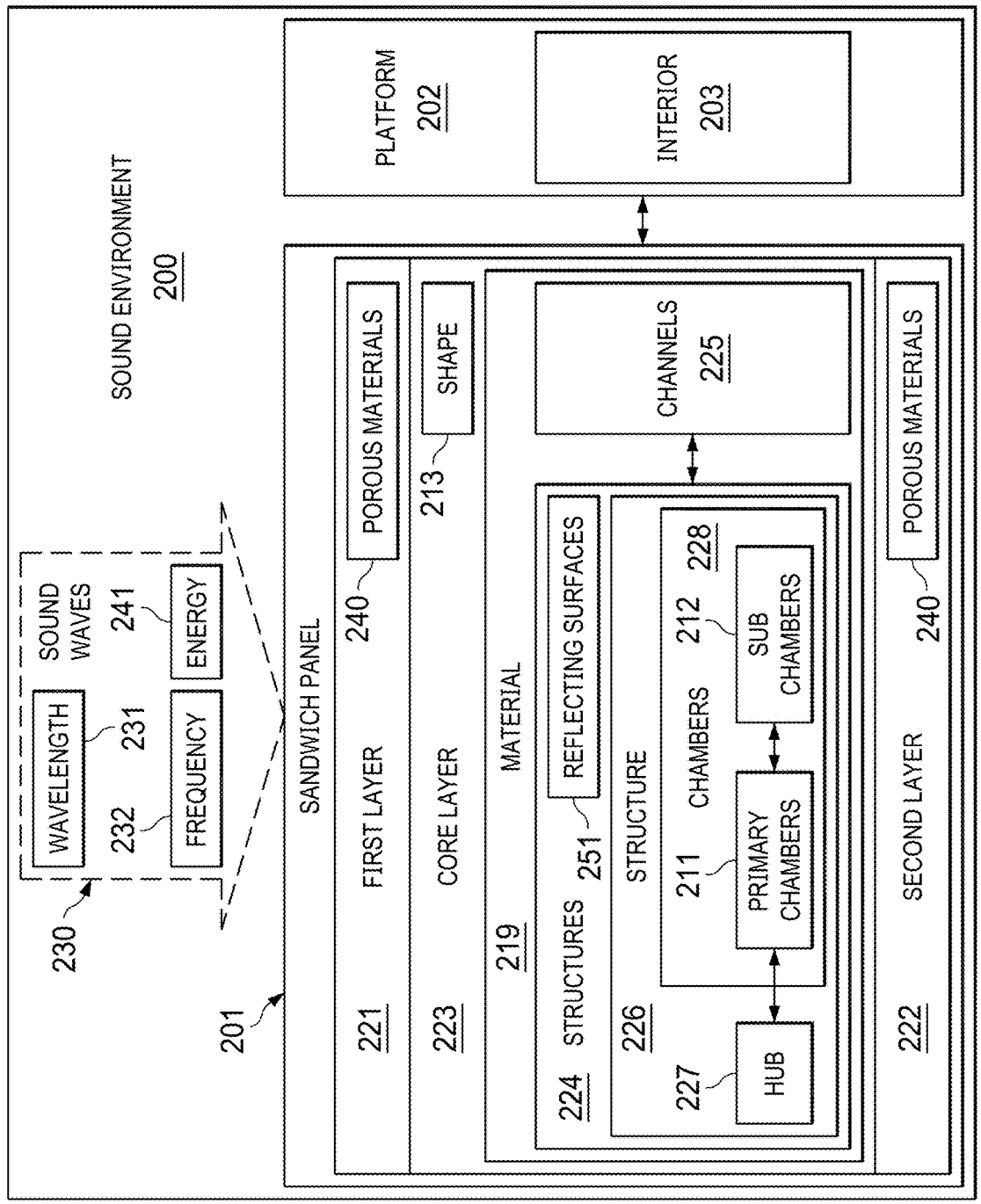
FIG. 2 is a block diagram of a noise environment in accordance with an illustrative embodiment.

With reference now to FIG. 2, a block diagram of a noise environment is depicted in accordance with an illustrative embodiment. In this illustrative example, sound environment 200 includes sandwich panel 201 that can be implemented in platform 202. Platform 202 can take a number of different forms. For example, platform 202 can be wherein the platform is selected from a group comprising platforms such as a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a personnel carrier, a train, a spacecraft, a space station, a submarine, an automobile, a power plant, a bridge, a dam, a house, a manufacturing facility, and a building. Aircraft 100 is an example of an implementation for platform 202.

In this example, sandwich panel 201 comprises a number of different components. As used herein, a "number of," when used with reference to items means one or more items. For example, a number of different components is one or more different components. As depicted, sandwich panel 201 comprises first layer 221, second layer 222, and core layer 223.

As depicted, core layer 223 is located between first layer 221 and second layer 222. Core layer 223 is comprised of structures 224 connected by channels 225. In this example, structures 224 and channels 225 are formed within material 219. Material 219 can be selected based on the ability of the material to reflect sound waves 230. Material 219 can be selected based on its own densities or reflecting sound waves 230. This type of material can also be referred to as a hard material that is capable of reflecting sound waves 230. For example, material 219 can be, for example, vulcanized rubber, polyethylene, marble, glass, lead, aluminum, steel, or some other suitable material. Additionally, material 219 can be a combination of these and other materials.

In this example, structures 224 and channels 225 reflect sound waves 230 entering core layer 223. In this example, structures 224 have reflecting surfaces 251 that can reflect sound waves 230. Sound waves traveling toward reflecting surfaces 251 can be referred to as incident sound waves. Sound waves 230 that returned from reflecting surfaces 251 can be referred to as reflected sound waves.

Further, structures 224 and channels 225 reflect sound waves 230 entering core layer 223 such that at least one of a wavelength 231 of sound waves 230 increases or frequency 232 of sound waves 230 decreases.

In this illustrative example, structure 226 in structures 224 can take a number of different forms. For example, structure 226 can comprise hub 227 and a number of chambers 228. In this example, the number of chambers can include a number of primary chambers 211 directly connected to hub 227. The number of chambers can also include a number of sub chambers 212 connected to the number of primary chambers.

In this example, other layers in sandwich panel 201 can operate to reduce the effects of sound waves 230. For example, first layer 221 is comprised of a number of porous materials 240 that dissipate energy 241 in the sound waves passing through first layer 221. Its porous material in the number of porous materials 240 can absorb sound waves 230. In other words, the porous material can dissipate energy 241 in sound waves 230.

As another example, second layer 222 can be comprised of the number of porous materials 240 that dissipate energy 241 in sound waves 230 passing through second layer 222 into interior 203 of platform 202. For example, interior 203 can be selected from at least a cabin, a passenger cabin, a gallery, a flight deck, a cargo area, a room, a conference room, the control center, or some interior portion of platform 202.

In this illustrative example, the number of porous materials 240 and second layer 222 can be the same or different from the number of porous materials 240 in first layer 221. This porous material can take various forms. In this example, sound transmission occurs with the portion of energy 241 in sound waves 230 that can transmit through a wall such as first layer 221 or second layer 222. Sound waves 230 can be transferred as energy molecules to molecules in a medium, which can be air or the material for a layer. With this example, sound collection is energy returning to the original medium.

In these illustrative examples, at least one of first layer 221 or second layer 222 can dissipate energy 241. One or both these two layers can dissipate energy 241 by at least one of vibration of air molecules against pore walls in the number of porous materials 240, pore compression and decompression in the number of porous materials 240, or vibration of pore walls in the number of porous materials 240. In this example, the vibration can include mechanical movement in which resonance is present in the pores vibrating.

For example, the number of porous materials 240 in first layer 221 dissipates energy 241 in sound waves 230 by at least one of generating heat from vibration of molecules in the number of porous materials 240, compressing and uncompressing of the number of porous materials 240 by sound waves 230, or vibrations of pore walls in the number of porous materials 240. In this example, the number of porous materials 240 in second layer 222 dissipates energy 241 in sound waves 230 by at least one of generating heat from vibration of molecules in the number of porous materials 240, compressing and uncompressing of the number of porous materials 240 by sound waves 230, or vibrations of pore walls in the number of porous materials 240.

In this illustrative example, a porous material is a material that contains voids. These voids can be open or closed. Open voids are voids that are connected to each other. The material in which these voids are located in is a structural frame. A porous material can be, for example, a foam or other type of material. In some illustrative examples, air is present in the porous material. Deflection of porous material can be based on the ability of that material to dissipate energy 241 and sound waves 230 that travel through the porous material. In this example, the size and shape of the voids in the number of porous materials 240 are selected based on energy dissipation. For example, to obtain desired or increase energy dissipation of energy 241 in sound waves 230, the size of the voids and the thickness of the walls forming the voids change to obtain a desired level of dissipation of energy 241.

In one illustrative example, first layer 221 and second layer 222 are porous layers formed from wherein the first layer and the second layer are porous layers formed from a foam with fibers in the foam.

Foams that can be used for porous materials 240 can take a number of different forms. For example, foams can include polyurethane (PU), polyether imide (PEI), polyethylene terephthalate (PET), a polyester foam, polyether sulphone, a polyvinyl chloride, and a hybrid foam.

The fibers that can be used can take a number of different forms. For example, fibers can include metallic fibrous materials and natural fibrous materials. Fibrous materials can include, for example, stainless steel, copper, and aluminum. Natural fibrous materials: can include coir, wood, coconut, straw, and cane.

Thus, sandwich panel 201 can reduce noise through the structure of sandwich panel 201 that comprises both porous materials in first layer 221 and second layer 222 and hard materials in core layer 223.

The illustration of sound environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, additional chambers can be connected to sub chambers 212. In other illustrative examples, chambers 228 may only include primary chambers 211 without sub chambers 212.

Although a single sandwich panel is depicted, multiple sandwich panels can be present in platform 202. In another illustrative example, sound waves 230 enter core layer 223 from first layer 221. With this example, structures 224 in core layer 223 have shape 213 that reflects at least a portion of the sound waves back into the first layer. For example, walls in structures 224 can be angled such that at least a portion of sound waves 230 is reflected back into first layer 221.

Figure 3:
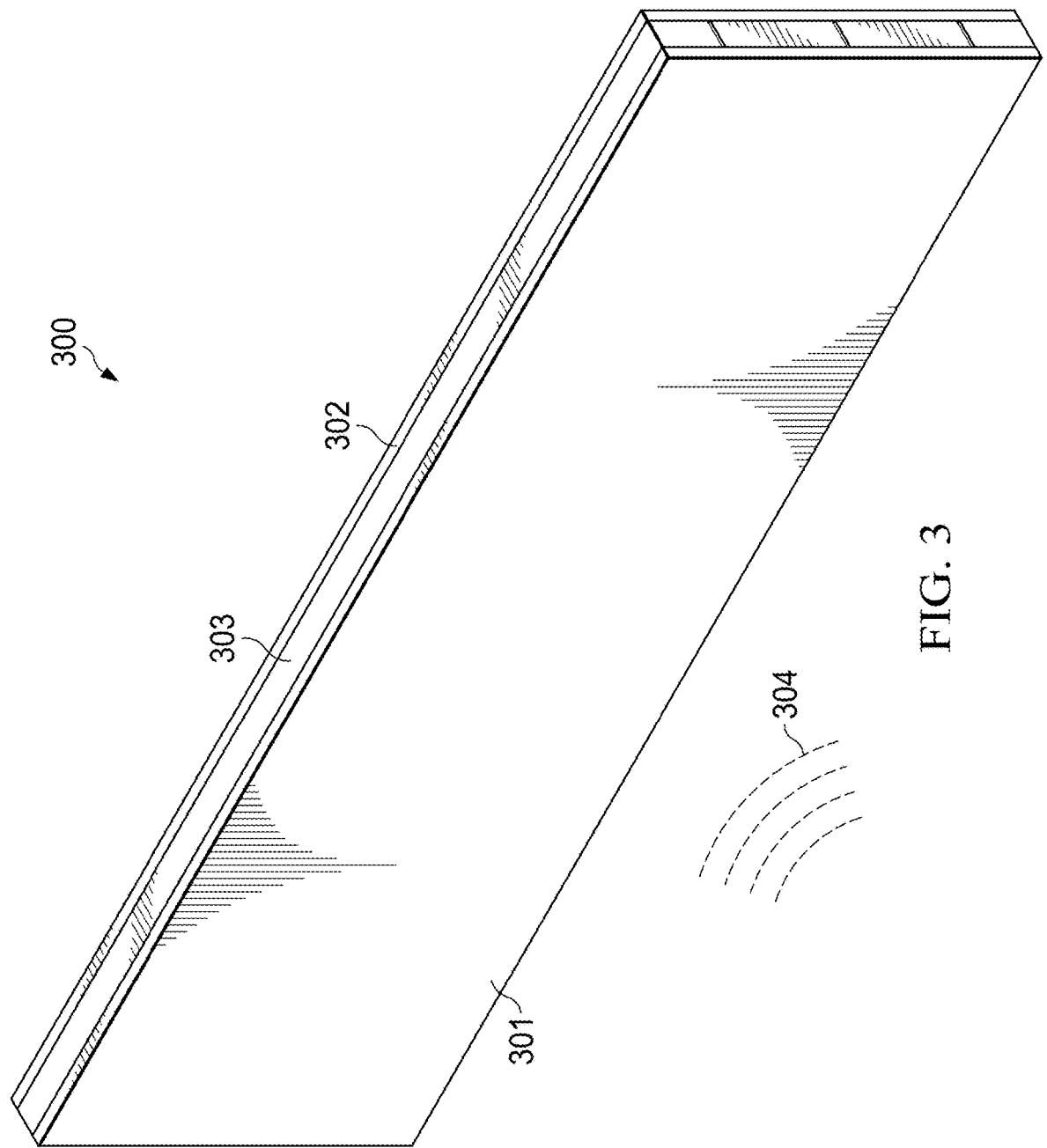
FIG. 3 is a pictorial illustration of a sandwich panel in accordance with an illustrative example.

Turning next to FIG. 3, a pictorial illustration of a sandwich panel is depicted in accordance with an illustrative example. Sandwich panel 300 is an example of an implementation for sandwich panel 201 shown in block form in FIG. 2.

As depicted in this example, sandwich panel 300 is comprised of first layer 301, second layer 302, and core layer 303. In this example, sound waves 304 can travel through sandwich panel 300.

In this illustrative example, first layer 301 and second layer 302 are comprised of number of porous materials. The number of porous materials in the layer are reflected based on sound absorption characteristics for absorbing energy in sound waves 304.

When sound waves 304 strike the porous materials in these layers, transformations can occur with respect to the sound energy in sound waves 304 that include reflection, absorption, and transmission which is used to quantify the dissipation abilities of porous materials. When sound waves 304 pass through porous materials, the air is compressed and released, resulting in energy consumption throughout the energy transformation process. Through the vibrations of pore walls, sound energy can be turned into mechanical and heat energy. Sound energy is converted into heat and released when air molecules vibrate and brush against the pore walls of porous materials.

Core layer 303 can be comprised of a hardened material that is selected to reflect sound waves 304 for travel into core layer 303. Sound waves 304 travel through structures (not shown) in core layer 303. These structures are acoustic structures that reflect sound waves 304. With the reflection of sound waves 304 within core layer 303, the frequency of sound waves 304 can be weakened as the sound's waves are reflected between the walls while travelling within the structures in core layer 303. These structures cause reflections and friction of the air flow, resulting in increased energy consumption. Additionally, core layer 303 can cause at least one of a wavelength of sound waves 304 to increase or a frequency of sound waves 304 to decrease.

Core layer 303 is comprised of one or more porous materials. This layer absorbs the energy leftover in sound waves 304 that enters second layer 302 from core layer 303. As a result, a further reduction or dissipation of energy in sound waves 304 occurs before sound waves 304 passes through second layer 302.

Thus, in this depicted example, the different layers in sandwich panel 300 can dissipate or absorb sound waves. In this example, first layer 301 is designed to absorb sound waves 304, core layer 303 is designed to designed to reflect sound waves 304 that reach core layer 303 from first layer 301. Second layer 302 is designed to absorb energy remaining in sound waves 304 that reach second layer 302 from core layer 303.

Figure 4:
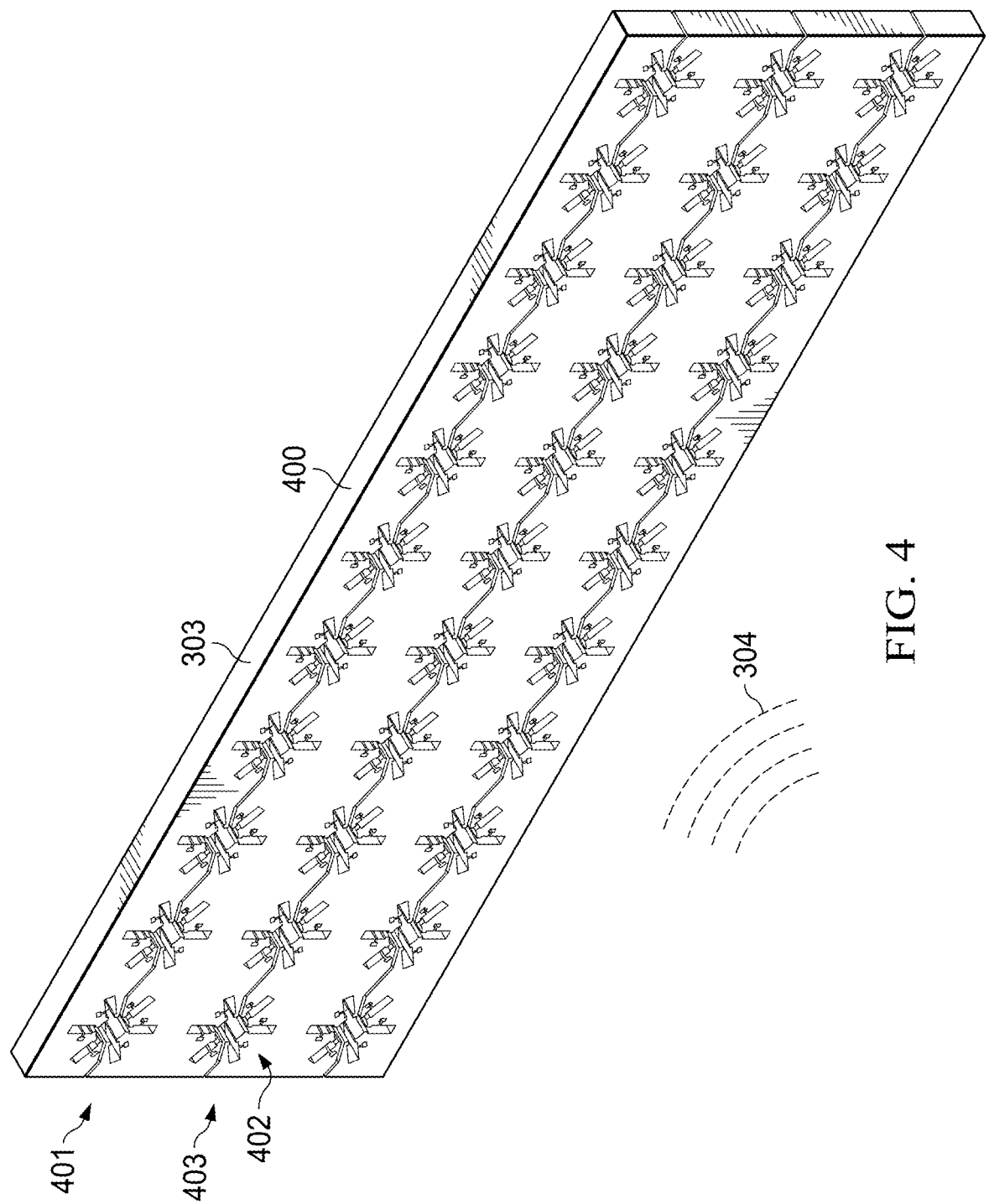
FIG. 4 is an illustration of a structures connected by channels in a core layer in accordance with an illustrative embodiment.

Next, FIG. 4 is an illustration of a structures connected by channels in a core layer in accordance with an illustrative embodiment. In the illustrative examples, the same reference numeral may be used in more than one figure. This reuse of a reference numeral in different figures represents the same element in the different figures.

In this example, core layer 303 in FIG. 3 is depicted without first layer 301 and second layer 302. In this view, acoustic network 401 is formed in material 400 and is comprised of structures 402 that are connected to each other by channels 403.

Structures 402 and channels 403 operate to reflect sound waves 304 in a manner that causes multiple reflections. These reflections of sound waves 304 can result in at least one of a wavelength of sound waves 304 that increases or a frequency of the sound waves 304 that decreases.

Figure 5:
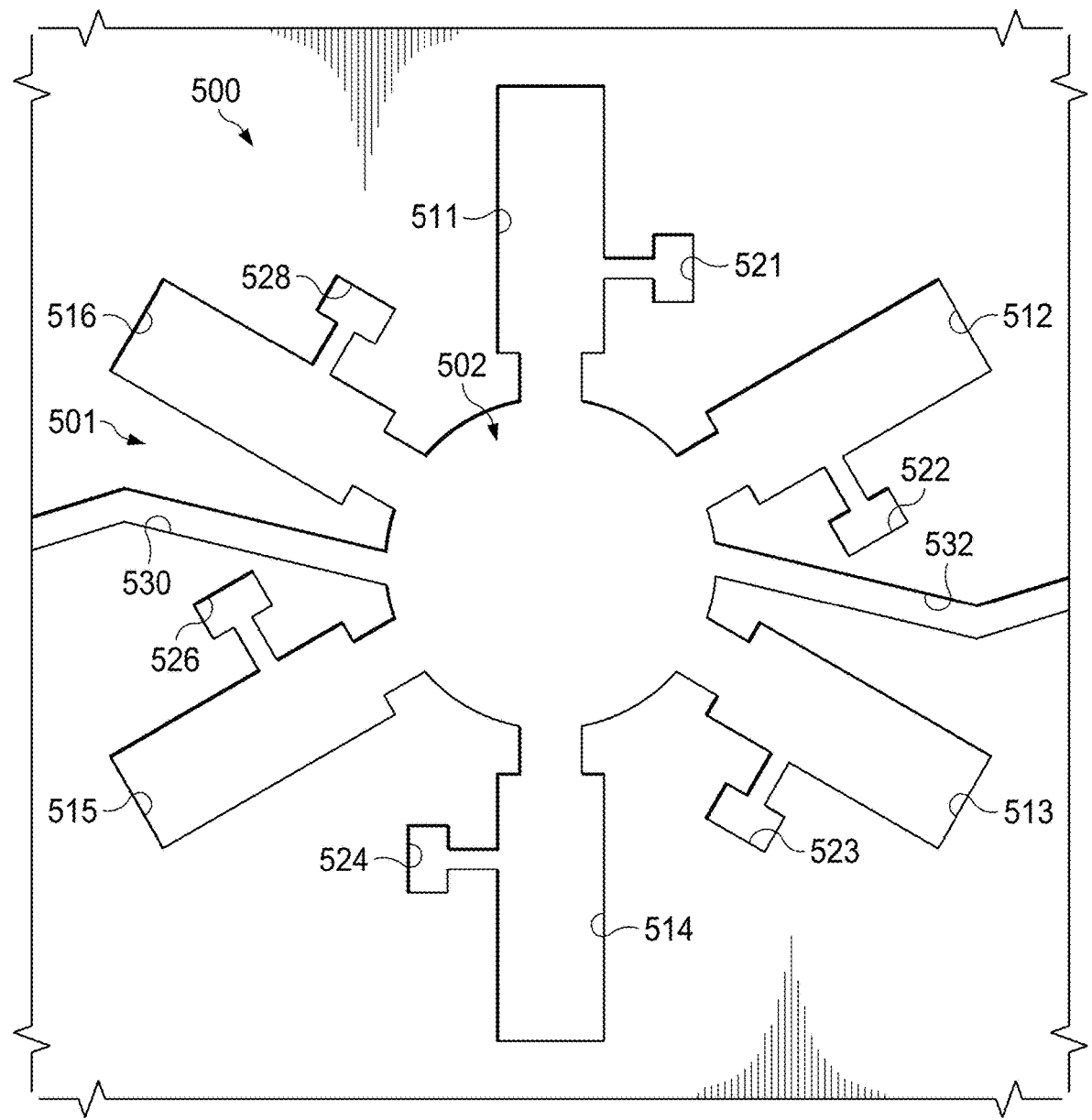
FIG. 5 is an illustration of structure in a core layer in accordance with an illustrative embodiment.

With reference next to FIG. 5, an illustration of structure in a core layer is depicted in accordance with an illustrative embodiment. Structure 500 is an example of structures 224 in FIG. 2 and is comprised of hub 502 connected to chambers 501. These structures can also be referred to as acoustic structures because they are the same reflect sound waves 230.

In this example, these chambers comprise chamber 511, chamber 512, chamber 513, chamber 514, chamber 515, and chamber 516. As depicted, these chambers extend radially from hub 502.

In this example, each of these chambers has a sub chamber. For example, chamber 511 has sub chamber 521; chamber 512 has sub chamber 522; chamber 513 has sub chamber 523, chamber 514 has sub chamber 524; chamber 515, as sub chamber 526; and chamber 516 has sub chamber 528. Channel 530 and channel 532 are connected to hub 502. These channels can connect structure 500 to other structures such as those in acoustic network 401 in core layer 303 in FIG. 4.

Thus, these different layers in sandwich panel 300 results in sound waves 304 passing between the layers in a manner that causes energy in sound waves 304 to dissipate and be consumed in various forms. Further, a wavelength of sound waves 304 can be increased in size. Also, the frequency of sound waves 304 reduced, cause a high frequency sound wave being converted into a low frequency sound wave. As a result, sound waves 304 reaching a passenger's ear are reduced.

The illustration of sandwich panel 300 in the different components in this panel in FIGS. 3-4 and the illustration of a structure connected to channels in FIG. 5 are provided as examples and not meant to limit the manner in which other illustrative examples can be implemented. For example, one or more layers in addition to the two outer layers and the core layer can be used in other sandwich panels. Other shapes and designs for core layer 303 can be used. For example, other numbers of chambers and sub chambers can be used. In other illustrative examples, a chamber can have two sub chambers rather than a single sub chamber. In yet other illustrative examples, other numbers of chambers can be used. For example, four chambers, eight chambers, or some other number of chambers can be used. Further, the configuration of these chambers and sub chambers can also have different shapes. For example, a square, a trapezoid, an oval, or other suitable shape can be used.

In yet another illustrative example, additional core layers can be used in addition to core layer 303 and first layer 301 and second layer 302. For example, two core layers can be present between first layer 301 and second layer 302. In another example, another core layer can be present on the other side of second layer 302. An additional layer can be present such that the second core layer is located between this additional layer and second layer 302.

Figure 6:
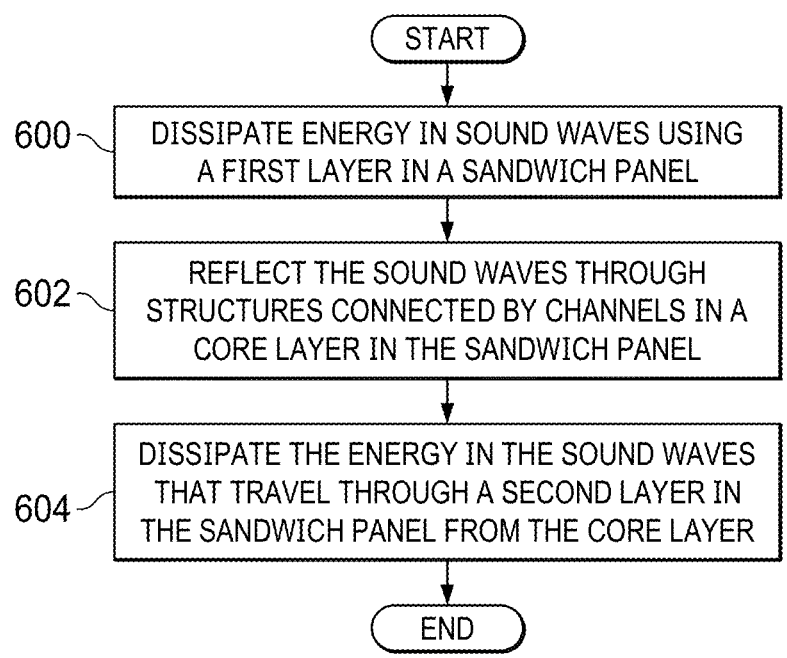
FIG. 6 is an illustration of a flowchart of a process for dampening sound waves in accordance with an illustrative embodiment.

Turning next to FIG. 6, an illustration of a flowchart of a process for dampening sound waves is depicted in accordance with an illustrative embodiment. The process in FIG. 7 can be implemented using sandwich panel 201 in FIG. 2 and sandwich panel 300 in FIGS. 3-4. In this example, the dampening of sound waves can include at least one of reducing the energy of the sound waves, increasing in length of the wavelength of the sound waves, or decreasing the frequency.

The process begins by dissipating energy in sound waves using a first layer in a sandwich panel (operation 600). In operation 600, when sound waves pass through porous materials, the air is compressed and released, resulting in energy consumption throughout the energy transformation process. Further, energy dissipation can occur through the vibrations of pore walls. In this case, energy in the sound waves can be transformed into mechanical energy and heat energy. Further, energy in the sound waves can be converted into heat and released when air molecules vibrate and brush against the pore walls of porous materials in the two outer layers. Further, the sound absorption can correspond to the design of the sandwich panels. For example, the design can include the of pores, size and continuous channels between the inner pores and the external surface of the materials.

The process reflects the sound waves through structures connected by channels in a core layer in the sandwich panel (operation 602). In operation 602, the sound waves enter the core layer from the first layer. Further, at least one of a frequency of the sound waves decreases in frequency or a wavelength of the sound waves increases in length in the core layer.

For example, the structures can comprise a hub and chambers with the structures being connected by channels. This design can reflect sound waves. For example, sound waves can reflect a hub and the chambers connected to the hub. The sound waves can also travel to sub chambers. With this reflection, the frequency of the sound waves can be weakened to some amount when the sound waves are reflected between the walls in the structures as the sound waves travel through the core layer. This weakening in frequency can be a reduction in the frequency of the sound waves.

The process dissipates the energy in the sound waves that travel through a second layer in the sandwich panel from the core layer (operation 604). The process terminates thereafter. In operation 604, the sound waves entering an interior of a platform are dampened. The dampening can reduce the energy in the sound waves, increase the length of the wavelength of the sound waves, or decrease the frequency of the sound waves.

Figure 7:
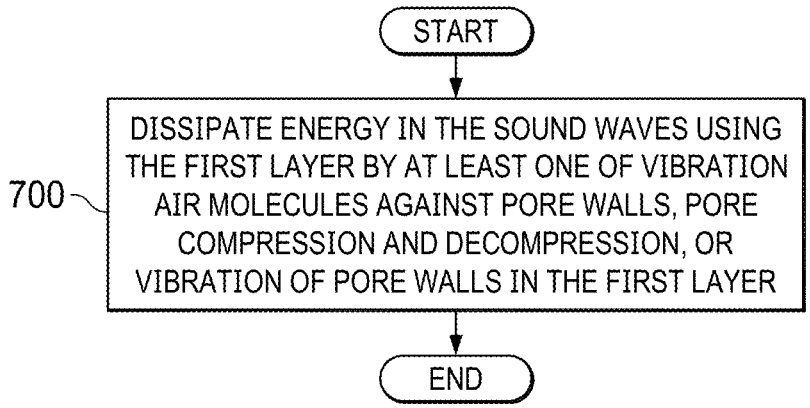
FIG. 7 is an illustration of a flowchart of a process for dampening energy in accordance with an illustrative embodiment.

With reference to FIG. 7, an illustration of a flowchart of a process for dampening energy is depicted in accordance with an illustrative embodiment. The process example of an implementation of operation 600 is shown in FIG. 6.

The process dissipates energy in the sound waves using the first layer by at least one of vibration air molecules against pore walls, pore compression and decompression, or vibration of pore walls in the first layer (operation 700). The process terminates thereafter.

Figure 8:
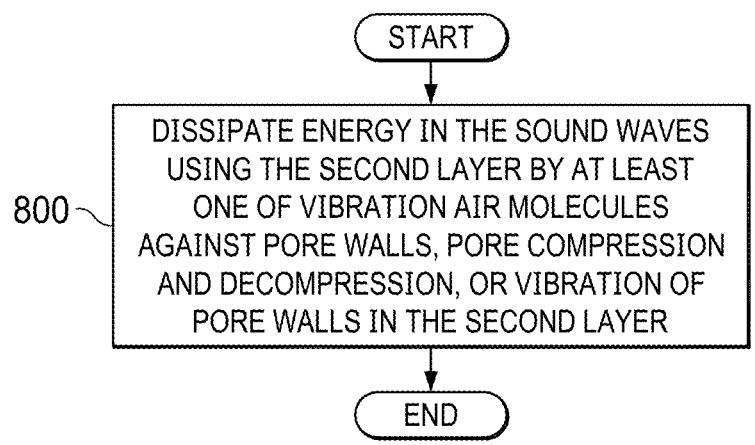
FIG. 8 is an illustration of a flowchart of a process for dampening energy in accordance with an illustrative embodiment.

Next in FIG. 8, an illustration of a flowchart of a process for dampening energy is depicted in accordance with an illustrative embodiment. The process example of an implementation of operation 604 in FIG. 6.

The process dissipates energy in the sound waves using the second layer by at least one of vibration air molecules against pore walls, pore compression and decompression, or vibration of pore walls in the second layer (operation 800). The process terminates thereafter.

Figure 9:
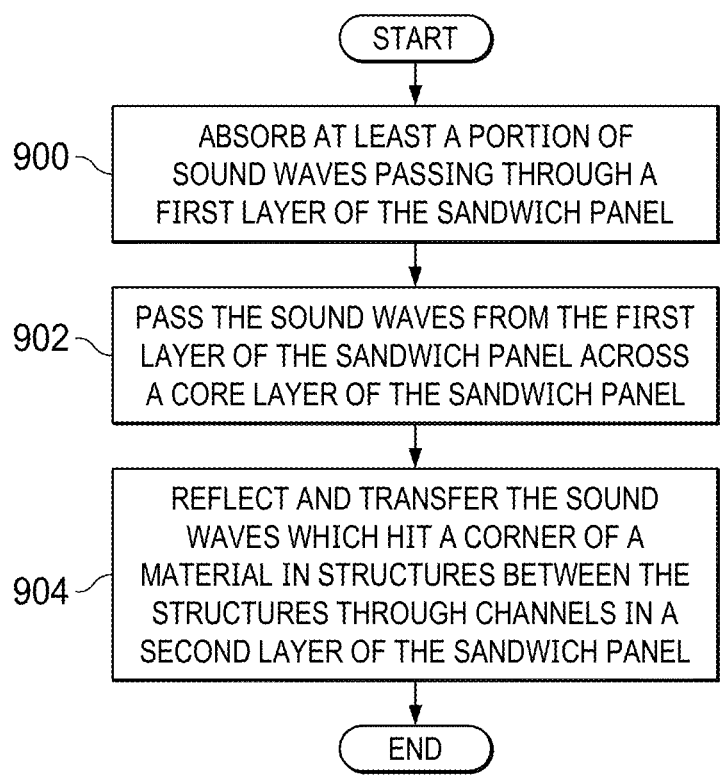
FIG. 9 is an illustration of a flowchart of a process for dampening sound waves in accordance with an illustrative embodiment.

Turning next to FIG. 9, an illustration of a flowchart of a process for dampening sound waves is depicted in accordance with an illustrative embodiment. The process in FIG. 6 can be implemented using sandwich panel 201 in FIG. 2 and sandwich panel 300 in FIGS. 3-4. In this example, the dampening of sound waves can include at least one of reducing the energy of the sound waves, increasing in length of the wavelength of the sound waves, or decreasing the frequency.

The process begins by absorbing at least a portion of sound waves passing through a first layer of the sandwich panel (operation 900). The process passes the sound waves from the first layer of the sandwich panel across a core layer of the sandwich panel (operation 902).

The process reflects and transfers the sound waves which hit a corner of a material in structures between the structures through channels in a second layer of the sandwich panel (operation 904). The process terminates thereafter. In operation 904, the corner of the material is one or more of the boundaries or surfaces of structures and channels. As a result, when sound waves strike different surfaces, the sound waves are reflected to travel through the different structures connected to each other by the channels.

Figure 10:
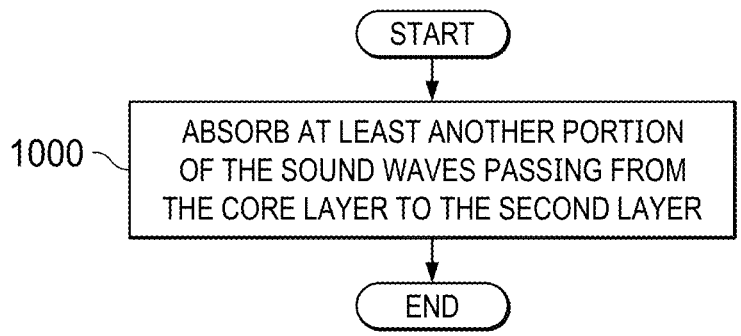
FIG. 10 is an illustration of a flowchart of process for dampening sound waves in accordance with an illustrative embodiment.

With reference now to FIG. 10, an illustration of a flowchart of a process for dampening sound waves is depicted in accordance with an illustrative embodiment. The process in this figure is an example of an additional operation that can be performed with the operations in FIG. 9.

The process absorbs at least another portion of the sound waves passing from the core layer to the second layer (operation 1000). The process terminates thereafter.

Figure 11:
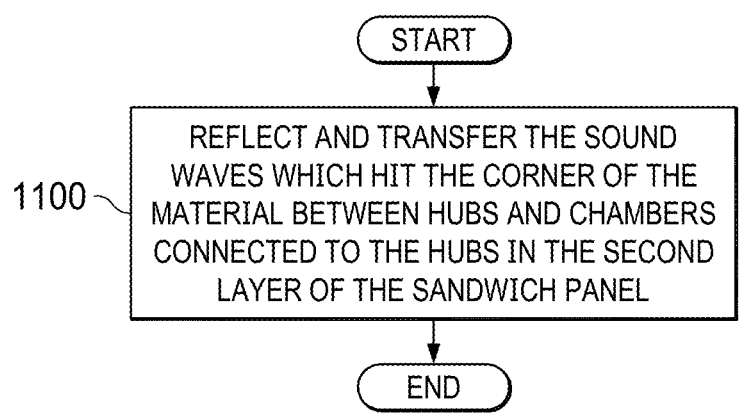
FIG. 11 is an illustration of a flowchart for reflecting and transferring sound waves in points with an illustrative embodiment.

With reference to FIG. 11, an illustration of a flowchart for reflecting and transferring sound waves is depicted in points with an illustrative embodiment. The process in this flowchart is an example of an implementation for operation 904 in FIG. 9.

The process reflects and transfers the sound waves which hit the corner of the material between hubs and chambers connected to the hubs in the second layer of the sandwich panel (operation 1100).

Figure 12:
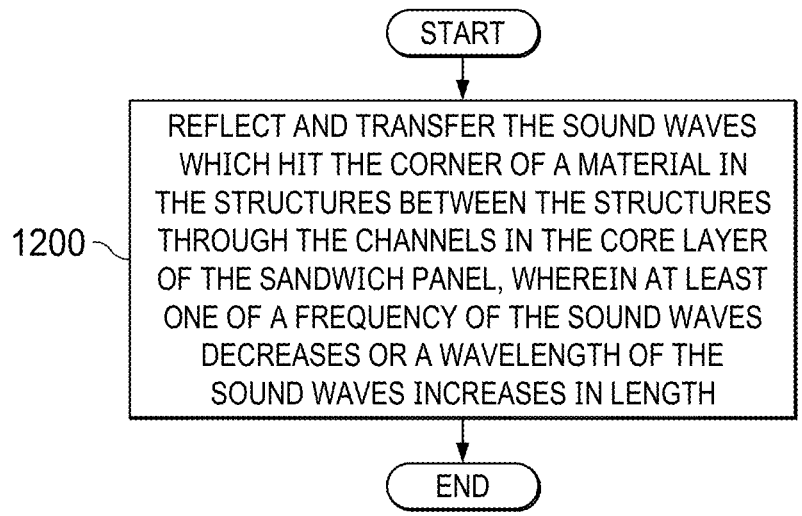
FIG. 12 is an illustration of a flowchart for reflecting and transferring sound waves in points with an illustrative embodiment.

Next in FIG. 12, an illustration of a flowchart for reflecting and transferring sound waves is depicted in points with an illustrative embodiment. The process in this flowchart is an example of an implementation for operation 904 in FIG. 9.

The process reflects and transfers the sound waves which hit the corner of a material in the structures between the structures through the channels in the core layer of the sandwich panel, wherein at least one of a frequency of the sound waves decreases or a wavelength of the sound waves increases in length (operation 1200). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 13:
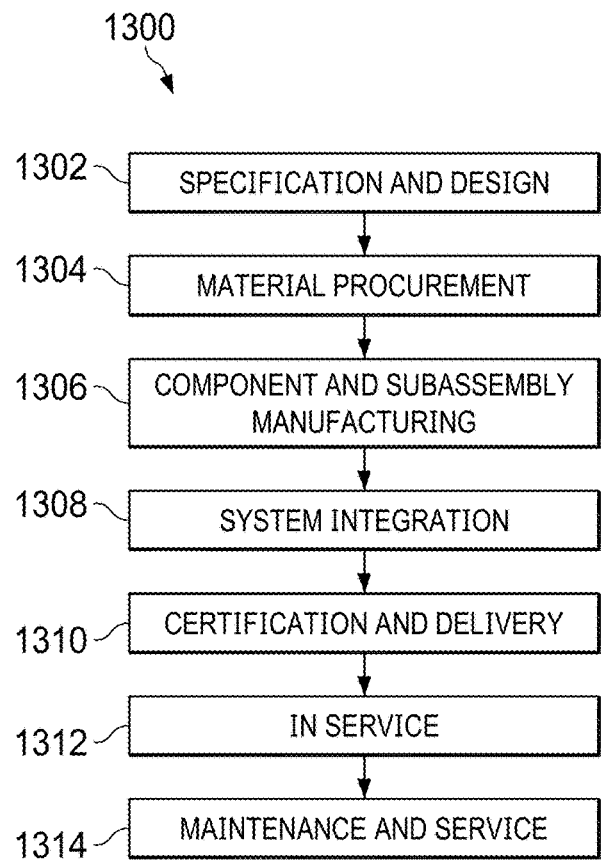
FIG. 13 is an illustration of an aircraft manufacturing and service method in accordance with an illustrative embodiment.
Figure 14:
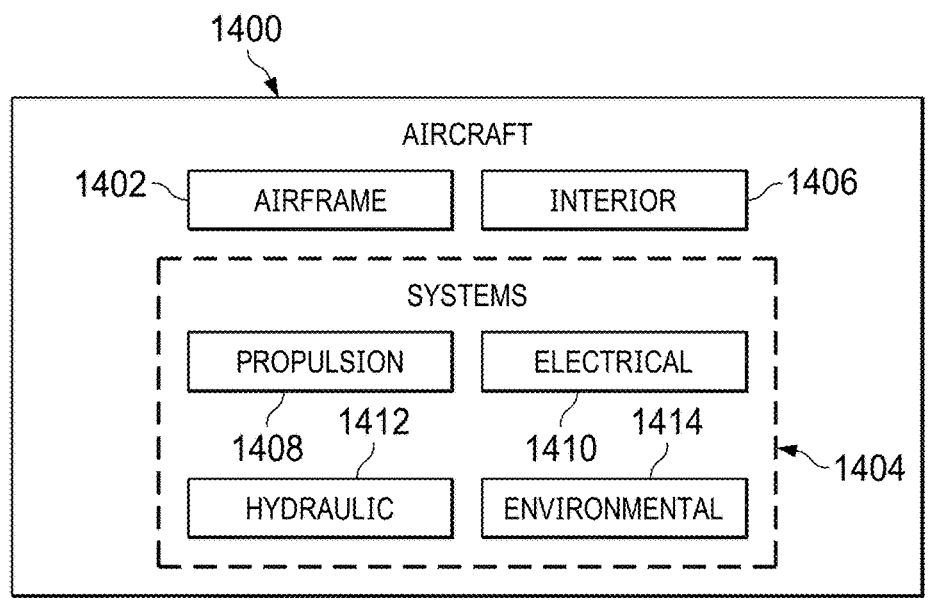
FIG. 14 is an illustration of a block diagram of an aircraft in which an illustrative embodiment may be implemented.

The illustrative embodiments of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in accordance with an illustrative embodiment. During preproduction, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 can go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13.

In one illustrative example, components or subassemblies produced in component and subassembly manufacturing 1306 in FIG. 13 can be fabricated or manufactured in a manner similar to components or subassemblies produced while aircraft 1400 is in service 1312 in FIG. 13. As yet another example, one or more apparatus embodiments, method embodiments, or a combination thereof can be utilized during production stages, such as component and subassembly manufacturing 1306 and system integration 1308 in FIG. 13. One or more apparatus embodiments, method embodiments, or a combination thereof may be utilized while aircraft 1400 is in service 1312, during maintenance and service 1314 in FIG. 13, or both. The use of a number of the different illustrative embodiments may substantially expedite the assembly of aircraft 1400, reduce the cost of aircraft 1400, or both expedite the assembly of aircraft 1400 and reduce the cost of aircraft 1400.

For example, sandwich panels can be added to the design of aircraft 1400 during specification and design 1302 of aircraft 1400. In another example, sandwich panels in the different illustrative examples can be manufactured during component and subassembly manufacturing 1306. As yet another example, sandwich panels in the different illustrative examples can be added to aircraft 1400 during maintenance and service 1314. This addition of sandwich panels can be performed during modification, reconfiguration, refurbishment, and other maintenance or service routine maintenance and service 1314.

Thus, the illustrative examples provide a method, apparatus, and system for dampening or reducing the effects of noise. In the different illustrative examples, the noise entering and interior of the platform can be reduced using sandwich panels in the different illustrative examples. In one illustrative example, the sandwich panel comprises a first layer, a second layer, and a core layer located between the first layer and the second layer. The core layer is comprised of structures connected by channels, and the structures and the channels reflect sound waves entering the core layer.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A sandwich panel comprising:
    a first layer, wherein the first layer is comprised of a number of porous materials that dissipate energy in sound waves passing through the first layer;
    a second layer, wherein the second layer is comprised of the number of porous materials that dissipate the energy in the sound waves passing through the second layer; and
    a core layer located between the first layer and the second layer, wherein the core layer is comprised of non-porous structures connected by channels and wherein the structures and the channels reflect sound waves entering the core layer from the first or second layer as the sound waves travel through the structures in order to increase the distance that the sound waves travel, wherein the first or second layer is configured to attempt to absorb any remaining energy in sound waves that reach the first or second layer from the core layer.

2. The sandwich panel of claim 1, wherein the structures and the channels reflect sound waves entering the core layer such that at least one of a wavelength of the sound waves increases or a frequency of the sound waves decreases.

3. The sandwich panel of claim 1, wherein the structures are acoustic structures that weaken the frequency of the sound waves as the sound waves are reflected between walls of the structures.

4. The sandwich panel of claim 3, wherein the second layer is comprised of the number of porous materials that dissipate the energy in the sound waves passing through the second layer into an interior of a platform.

5. The sandwich panel of claim 3, wherein the sound waves enter the core layer from the first layer and wherein the structures in the core layer have a shape that reflects at least a portion of the sound waves back into the first layer.

6. The sandwich panel of claim 1, wherein a structure in the structures comprises:
   a hub; and
   a number of chambers connected to the hub, wherein the number of chambers extends radially from the hub.

7. The sandwich panel of claim 6, wherein the number of chambers comprises a number of primary chambers directly connected to the hub and a number of sub chambers connected to the number of primary chambers.

8. The sandwich panel of claim 1, wherein the first layer and the second layer are porous layers formed from a foam with fibers in the foam.

9. The sandwich panel of claim 3, wherein the number of porous materials in the first layer dissipates the energy in the sound waves by at least one of generating heat from vibration of molecules in the number of porous materials, compressing and uncompressing of the number of porous materials by the sound waves, or vibrations of pore walls in the number of porous materials.

10. The sandwich panel of claim 4, wherein the number of porous materials in the second layer dissipates the energy in the sound waves by at least one of generating heat from vibration of molecules in the number of porous materials, compressing and uncompressing of the number of porous materials by the sound waves, or vibrations of pore walls in the number of porous materials.

11. The sandwich panel of claim 4, wherein the platform is selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle a personal air vehicle, a surface ship, a personnel carrier, a train, a spacecraft, a space station, a submarine, an automobile, a power plant, a bridge, a dam, a house, a manufacturing facility, and a building.

12. A sandwich panel comprising:
   a first layer comprised of a number of porous materials that dissipate energy in sound waves passing through the first layer;
   a core layer, wherein the core layer is comprised of non-porous structures connected by channels and wherein the structures and the channels reflect sound waves entering the core layer from the first layer such that at least one of a wavelength of the sound waves increases in length or a frequency of the sound waves decreases; and
   a second layer comprised of the number of porous materials that dissipate any remaining energy in the sound waves from the core layer passing through the second layer into an interior of an aircraft, wherein the core layer is located between the first layer and the second layer.

13. The sandwich panel of claim 12, wherein a structure in the structures comprises:
   a hub; and
   a number of chambers connected to the hub, wherein the number of chambers extends radially from the hub.

14. The sandwich panel of claim 13, wherein the number of chambers comprises a number of primary chambers directly connected to the hub and a number of sub chambers connected to the number of primary chambers.

15. The sandwich panel of claim 12, wherein the first layer and the second layer are porous layers formed from a foam with fibers in the foam.

16. The sandwich panel of claim 12, wherein the number of porous materials in the first layer and the second layer dissipates the energy in the sound waves by at least one of generating heat from vibration of molecules in the number of porous materials, compressing and uncompressing of the number of porous materials by the sound waves, or vibrations of pore walls in the number of porous materials.

17. A method of damping sound waves, the method comprising:
   dissipating energy in sound waves using a first layer in a sandwich panel, wherein the first layer is comprised of porous materials;
   reflecting the sound waves through non-porous structures connected by channels in a core layer in the sandwich panel, wherein the sound waves enter the core layer from the first layer; and
   dissipating the energy in the sound waves that travel through a second layer in the sandwich panel from the core layer, wherein the second layer is comprised of porous materials, and wherein the sound waves entering an interior of a platform are dampened.

18. The method of claim 17, wherein dissipating energy in the sound waves using the first layer comprises:
   dissipating energy in the sound waves using the first layer by at least one of vibration air molecules against pore walls, pore compression and decompression, or vibration of pore walls in the first layer.

19. The method of claim 17, wherein dissipating energy in the sound waves using the second layer comprises:
   dissipating energy in the sound waves using the second layer by at least one of vibration air molecules against pore walls, pore compression and decompression, or vibration of pore walls in the second layer.

20. The method of claim 17, wherein at least one of a frequency of the sound waves decreases in frequency or a wavelength of the sound waves increases in length in the core layer.

21. A method of reducing a frequency of sound waves passing through a sandwich panel, the method comprising:
   absorbing at least a portion of sound waves passing through a first layer of the sandwich panel, wherein the first layer is comprised of porous material;
   passing sound waves from the first layer of the sandwich panel across a core layer of the sandwich panel; and
   reflecting and transferring the sound waves which hit a corner of a material in non-porous structures between the structures through channels in a second layer of the sandwich panel, wherein the second layer is comprised of porous material.

22. The method of claim 21 further comprising:
   absorbing at least another portion of the sound waves passing from the core layer to the second layer.

23. The method of claim 21, wherein reflecting and transferring the sound waves comprises:
   reflecting and transferring the sound waves which hit the corner of the material between hubs and chambers connected to the hubs in the second layer of the sandwich panel.

24. The method of claim 21, wherein reflecting and transferring the sound waves comprises:
   reflecting and transferring the sound waves which hit the corner of the material in the structures between the structures through the channels in the core layer of the sandwich panel, wherein at least one of the frequency of the sound waves decreases or a wavelength of the sound waves increases in length.

* * * * *